US 7,184,948 B2

(12) United States Patent
Chalabi

(10) Patent No.: US 7,184,948 B2
(45) Date of Patent: Feb. 27, 2007

(54) METHOD AND SYSTEM FOR THEME-BASED WORD SENSE AMBIGUITY REDUCTION

(75) Inventor: Achraf Chalabi, Cairo (EG)

(73) Assignee: Sakhr Software Company, Cairo (EG)

( * ) Notice: Subject to any disclaimer, the term of this patent is extended or adjusted under 35 U.S.C. 154(b) by 1065 days.

(21) Appl. No.: 09/882,539

(22) Filed: Jun. 15, 2001

(65) Prior Publication Data
US 2003/0028367 A1 Feb. 6, 2003

(51) Int. Cl.
*G06F 17/27* (2006.01)
(52) U.S. Cl. .............................. 704/9; 704/1
(58) Field of Classification Search ............ 704/9
See application file for complete search history.

(56) References Cited

U.S. PATENT DOCUMENTS

| | | | | |
|---|---|---|---|---|
| 5,694,523 | A * | 12/1997 | Wical | 706/45 |
| 5,708,822 | A * | 1/1998 | Wical | 704/1 |
| 5,768,580 | A | 6/1998 | Wical | 707/102 |
| 5,794,050 | A * | 8/1998 | Dahlgren et al. | 717/144 |
| 5,873,056 | A * | 2/1999 | Liddy et al. | 704/9 |
| 5,887,120 | A * | 3/1999 | Wical | 706/46 |
| 5,918,236 | A * | 6/1999 | Wical | 715/500 |
| 5,930,788 | A * | 7/1999 | Wical | 707/5 |
| 6,006,221 | A * | 12/1999 | Liddy et al. | 707/5 |
| 6,026,388 | A * | 2/2000 | Liddy et al. | 707/1 |
| 6,513,027 | B1 * | 1/2003 | Powers et al. | 706/47 |

OTHER PUBLICATIONS

Guthri et al., Subject-Dependent co-occurrence and word sense disambiguationJun. 1991, ACM, Computer Research Laboratory New Mexico State University, pp. 146-152.*

* cited by examiner

*Primary Examiner*—Richemond Dorvil
*Assistant Examiner*—Lamont Spooner
(74) *Attorney, Agent, or Firm*—Jones Day

(57) ABSTRACT

Word sense ambiguity, for "thematic" words in a sentence, is achieved based on thematic prediction. The senses of "thematic" words are disambiguated in a sentence by determining and weighting possible themes for that sentence. Possible themes are determined for that sentence based on thematic information associated with the different senses of each word in the sentence. A highly deterministic thematic-based word sense disambiguation method is used to preprocess the sentence prior to further syntactic and semantic analysis, thereby enhancing accuracy and decreasing the demand for computational resources (memory and CPU) by reducing input ambiguities.

26 Claims, 10 Drawing Sheets

METHOD AND SYSTEM FOR THEME-BASED WORD SENSE AMBIGUITY REDUCTION

BACKGROUND OF THE INVENTION

1. Field of Invention

The present invention relates generally to the field of natural language. More specifically, the present invention is related to word sense ambiguity reduction based on automatic theme prediction.

2. Discussion of Prior Art

Word sense disambiguation is the process of selecting the correct sense of each word in a sentence, based on the word's usage (or context) in the sentence. For example, the sense of the word "bank" as a noun in the English language is either "a building for keeping money safely" or "a land along the side of a river", based on the context in which the word "bank" occurs. The accurate recognition of this distinction is particularly important in machine translation systems, because "bank" as a noun is translated differently depending on whether it meant the first sense or the second one.

FIG. 1 illustrates the various natural language analysis systems. A natural language analysis system 100 is conventionally composed of two types of processes: processes which present possible alternatives (ambiguities) 102 to words; particularly nouns, in a sentence and processes which select correct alternatives (disambiguation) 104 to words based on the context of the sentence which is subject to analysis.

FIG. 2 illustrates the various types of ambiguities associated with prior art natural language analysis systems. Ambiguities in natural language analysis come in three basic forms:

Morphological ambiguity 202 occurs when a word has more than one part-of-speech. For example, the word "play" can be used as a verb or noun.

Semantic ambiguity 204 occurs when a word/part-of-speech pair has more than one sense (meaning). For example, the word "bank" when used as a noun can have two different senses as described above.

Syntactic (structural) ambiguity 206 occurs when a sentence (or a group of words) has more than one syntactic structure. For example, in the phrase, "a French book writer", the term "French" may be an adjective modifying the word "book" or the word "writer".

FIG. 3 illustrates a prior art system 300 for natural language sentence analysis. The input to the system is a natural language sentence 302, which is first segmented into separate word tokens using a tokenizer 304. Each word token is then morphologically analyzed by a morphological analyzer (stemmer/lemmatizer) 306, which in turn identifies all valid parts of speech for each input word, according to predefined stemming rules and based on lexicon 312 of the language (which contains for each stem all possible parts of speech). It should be noted that 'stem', as described in this patent application, is the basic form of any word token (e.g., the stem of "went" is "go"). The sentence, consisting of morphologically ambiguous part-of-speech tagged word tokens, then passes through a part-of-speech preliminary ambiguity resolver 308, that disambiguates parts of speech in a quasi-deterministic fashion. Many conventional rule-based and statistical techniques are used to achieve this process. The part-of-speech tagged word tokens then pass through a lexicalizer 310, which assigns each word/part-of-speech pair, one or more senses by accessing the language lexicon 312. The sentence generated from lexicalizer 310, which is now fully part-of-speech tagged and sense tagged is presented to syntactic & semantic analyzer 314, which resolves all embedded ambiguities in the input sentence by accessing a source with knowledge of grammar and word sense disambiguation and, as a result, generates a sentence with no ambiguities on morphological, semantic and syntactic levels.

The main function of syntactic & semantic analyzer 314 is to disambiguate the input sentence, that is, to select those correct possibilities out of the multitude of presented possibilities (ambiguities). Minimizing such ambiguities would further enhance the accuracy and performance of the disambiguation process. Hence, there is a need for a method and system that reduces the semantic ambiguity presented to the syntactic & semantic analyzer. Whatever the precise merits, features and advantages of the above mentioned prior art systems, none of them achieve or fulfills the purposes of the present invention.

SUMMARY OF THE INVENTION

The present invention provides for a method and system to provide accurate partial word sense disambiguation for "thematic" words in a sentence, based on thematic prediction. The method disambiguates the senses of "thematic" words in a sentence by determining and weighting possible themes for that sentence. The method determines possible themes for that sentence based on thematic information associated with the different senses of each word in the sentence. The present invention's highly deterministic thematic-based word sense disambiguation method preprocesses the sentence prior to further syntactic and semantic analysis. Thus, enhancing accuracy of the latter and decreasing its demand for computational resources (memory and CPU) by reducing input ambiguities.

DESCRIPTION OF THE PREFERRED EMBODIMENTS

Figure 1:
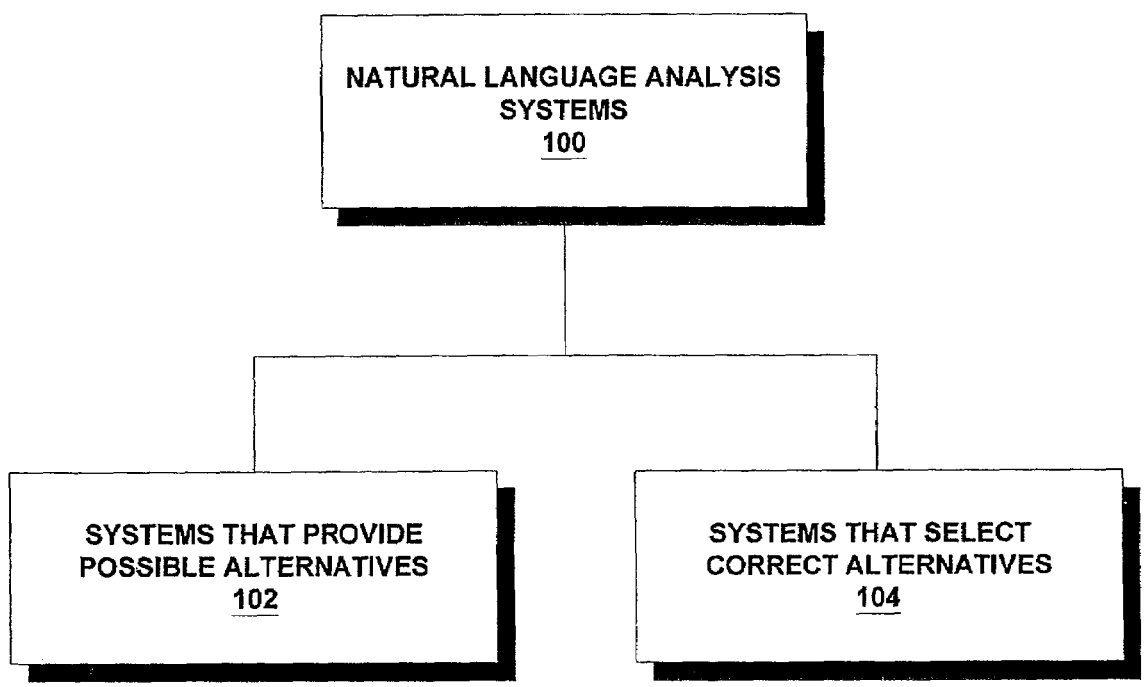
FIG. 1 illustrates basic components of natural language analysis systems.
Figure 2:
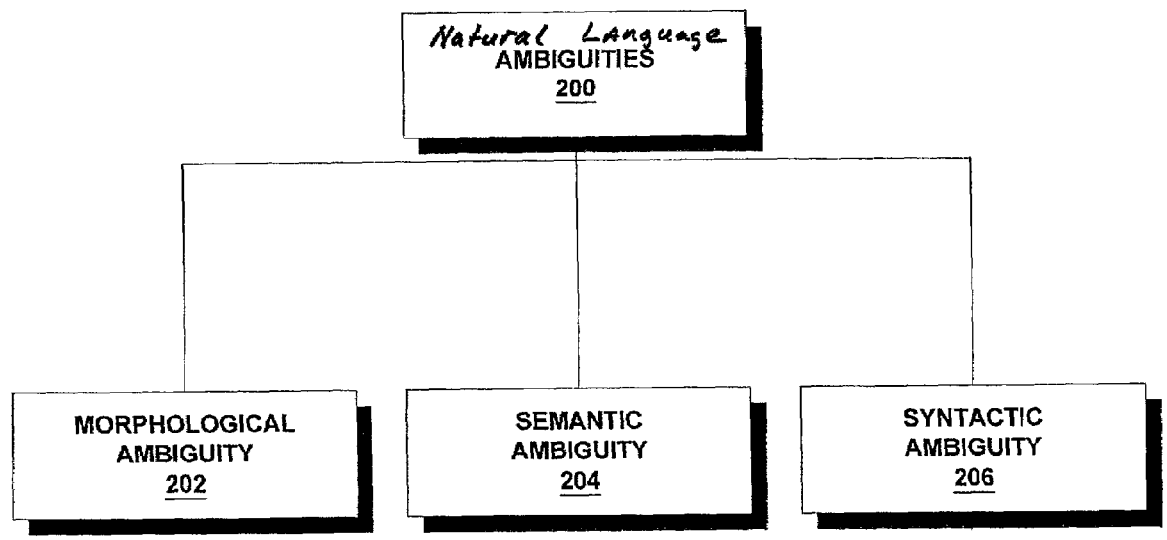
FIG. 2 illustrates various types of ambiguities associated with prior art natural language analysis systems.
Figure 3:
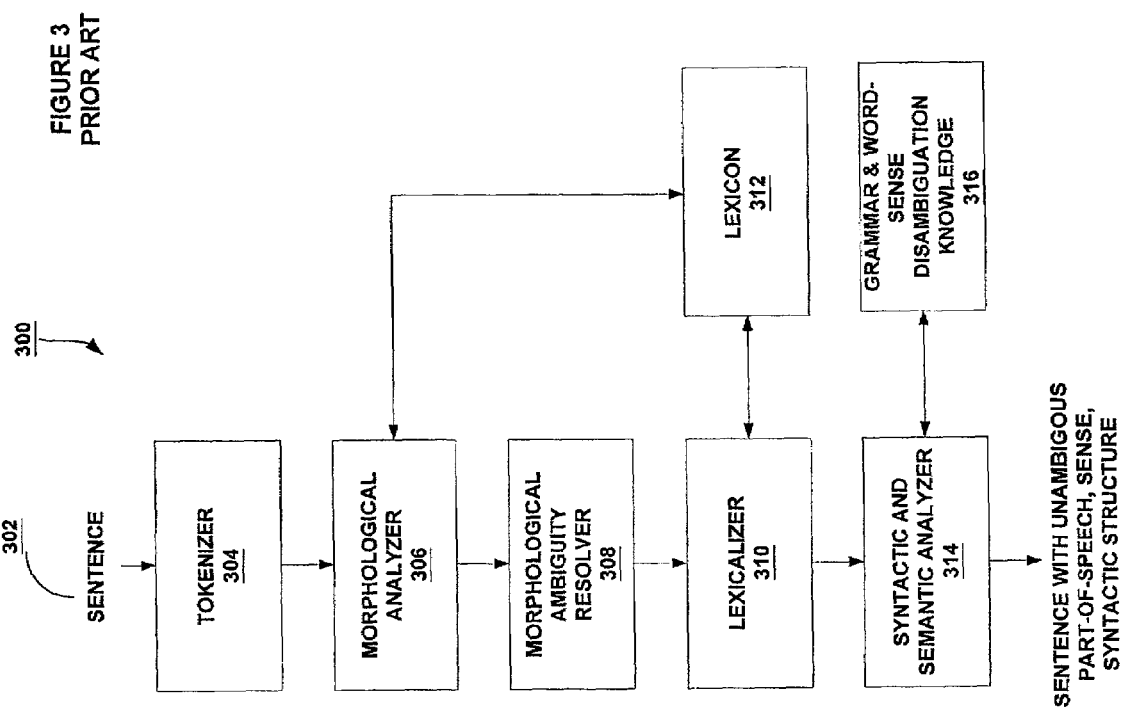
FIG. 3 is a schematic representation of a natural language sentence analysis system as is known in the art.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an example of the principles of the invention and the associated functional specifications for its construction and is not intended to limit the invention to the embodiment illustrated. In particular, the present invention is useful in association with languages other than English or in addition to English. Those skilled in the art will envision many other possible variations within the scope of the present invention.

The present invention provides a method for reducing sense ambiguity of part-of-speech tagged words in a sentence by automatic theme prediction based on the sentence local context. This sense ambiguity reduction is reached either through elimination of remotely probable senses or selection of highly probable senses. Thus, the method of the present invention results in:

Increasing the overall accuracy of the analysis process
Reducing the amount of required computational resources in terms of processing power and memory
Speeding up the analysis process This highly deterministic and accurate theme-based word sense ambiguity reduction is useful in a variety of natural language processing applications, especially in natural language analysis systems.

Figure 4:
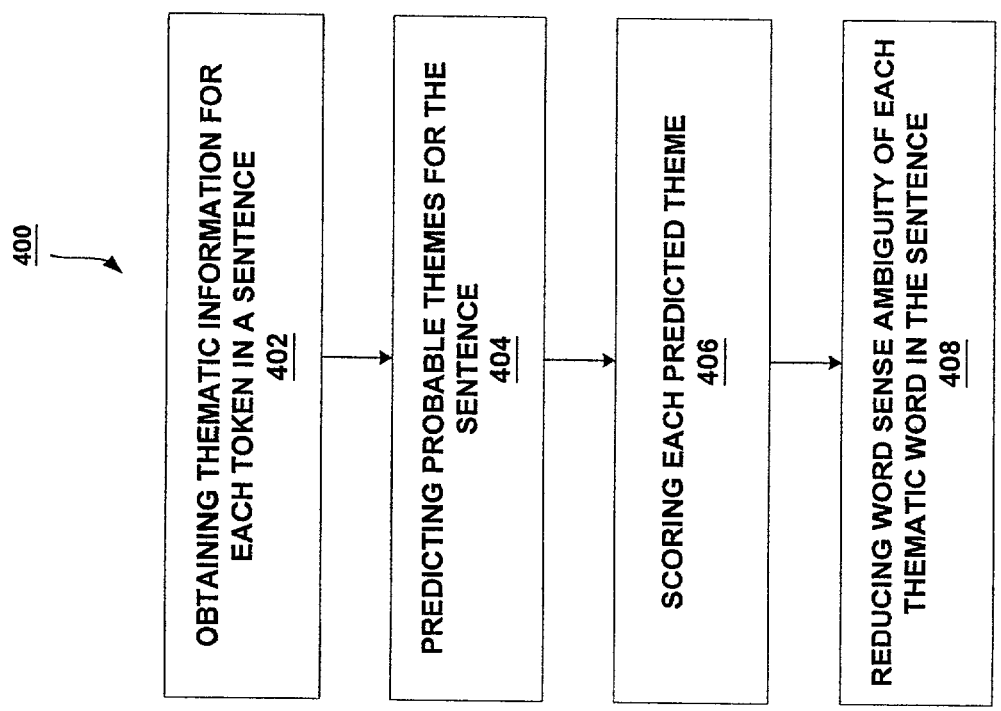
FIG. 4 is a flow chart of one embodiment of the steps in accordance with the present invention which performs word sense ambiguity reduction based on thematic prediction.

FIG. 4 illustrates method 400 of the present invention that provides, in response to a sentence input, theme-based reduction of sense ambiguity for the words of the input sentence. Method 400 starts by obtaining thematic information for each word in the input sentence (step 402). Next, a set of one or more probable themes for the input sentence (based on its context) is predicted (step 404). In step 406, a computation is made to determine a score for each theme (based on the number of words carrying this theme) and part-of-speech tags assigned to these words). Lastly, in step 408, sense ambiguity regarding each "thematic word" in the sentence is reduced either by eliminating a remotely probable sense or by selecting a highly probable sense. In this one embodiment of the present invention, elimination and/or selection of senses is performed only on thematic words, and is based on the dominant predicted theme. The dominant predicted theme is the predicted theme itself in case of only one predicted theme, and is the theme with the highest score in case of multiple predicted themes. It should be further noted that "thematic word", as used in this patent application, is a word in the input sentence having at least one sense tagged with at least one theme.

Figure 5:
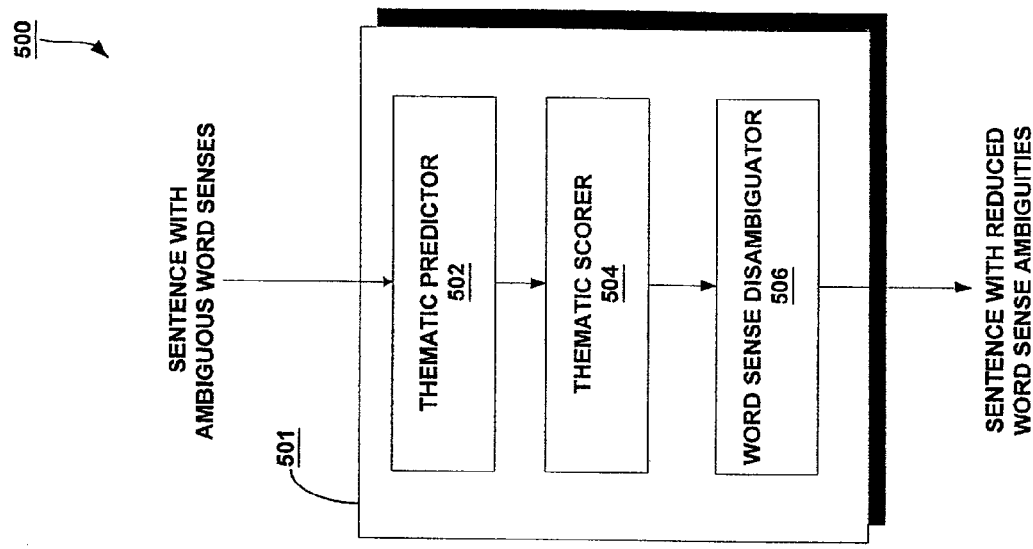
FIG. 5 is a schematic representation of one embodiment of a software program in accordance with the present invention which reduces word sense ambiguities in a sentence based on thematic prediction.

FIG. 5 is a representation of one embodiment of a software program in accordance with the present invention, which reduces word sense ambiguities in a sentence. The program of FIG. 5, as well as other programs described herein, may be implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of natural language processing programming. Program 501 receives as input a sentence consisting of a series of part-of-speech tagged words, and produces as output the same sentence with reduced word sense ambiguities. Program 501 consists of thematic predictor 502, thematic scorer 504, and word sense disambiguator 506.

Thematic predictor 502 receives a sequence of part-of-speech tagged words and produces as output a sequence of sense tagged words and a set of one or more probable themes associated with the output sequence. Thematic scorer 504 receives as input the sequence of words generated from thematic predictor 502, wherein each word is part-of-speech tagged, each part-of-speech is sense-tagged, and each sense is theme-tagged. In addition to the sequence of tagged words, a set of one or more predicted themes are presented to thematic scorer 504. Thematic scorer 504 computes and assigns a score to each of the predicted themes and produces, as output, the same sequence of part-of-speech, sense, theme tagged words, and the same set of predicted themes, with each assigned a corresponding score.

Word sense disambiguator 506 receives as input the same sequence of part-of-speech, sense, and theme tagged words, and the set of the weighted predicted themes generated from thematic scorer 504, and outputs the same sequence of words with reduced sense ambiguities by eliminating remotely probable senses or selecting highly probable senses on thematic words. Part-of-speech tagged sentence words are the input sequence that is processed by thematic predictor 502. A part-of-speech tagged word is built by stemming each word in the input sentence (by a stemmer) and annotating each word with the part-of-speech tags stored in a lexicon.

Figure 6:
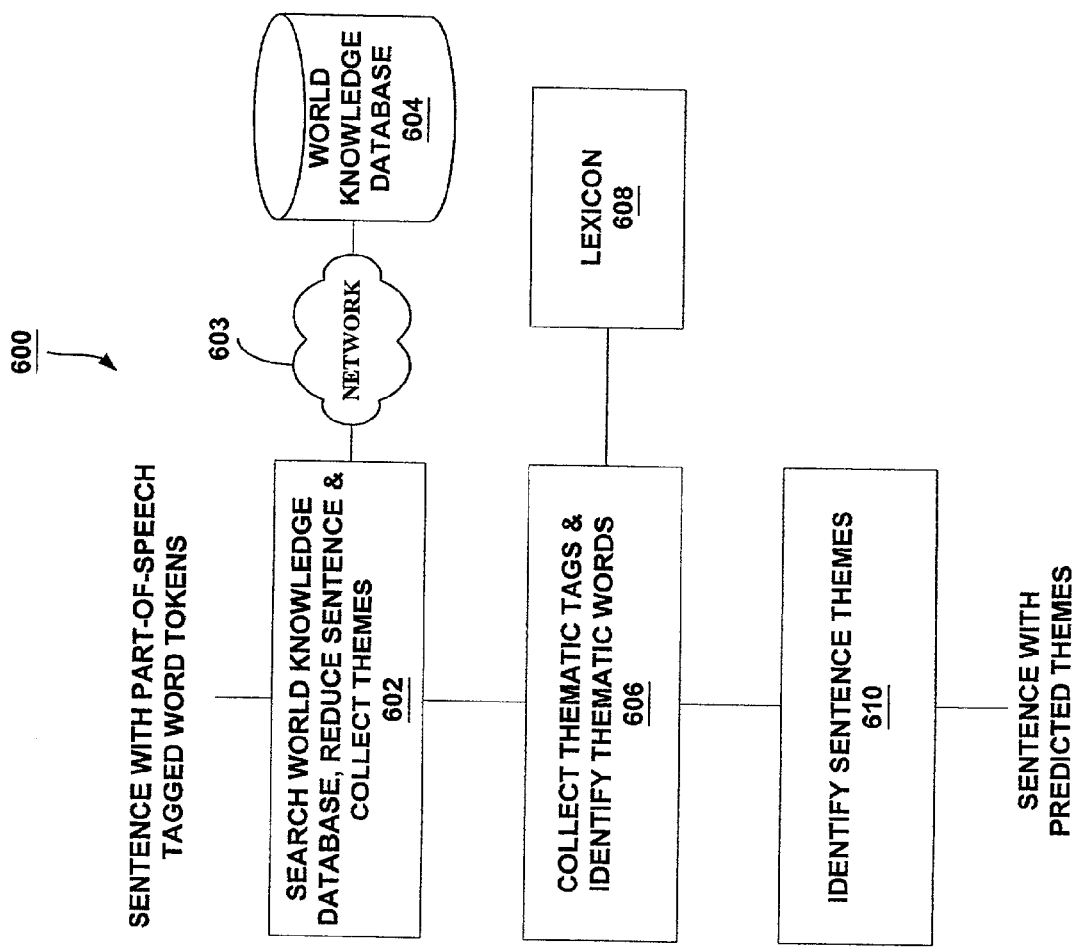
FIG. 6 is a schematic representation of one embodiment of the steps in accordance with the thematic predictor of the present invention.

FIG. 6 is representative of one embodiment of the present invention wherein a software program with thematic predictor 502 (FIG. 5) of the present invention automatically predicts, (from a predefined limited set of themes, as shown in Table 1 given below) one or more themes and assigns them to the input sentence. Thematic predictor 502 (FIG. 5) receives as input a sentence consisting of part-of-speech tagged words and produces, as output, the same sentence consisting of words tagged with part-of-speech, sense and theme, along with one or more automatically predicted theme assigned to the sentence as a whole. Prior to theme prediction, thematic predictor 502 (FIG. 5) searches a "World Knowledge" database 604, to identify pre-stored names (step 602) in the database, in the input sentence, from the sentence start to its end, considering (N−1) succeeding words. N is defined as being the maximum number of words an entry in the "World Knowledge" database 604 has. It should be noted that, in one embodiment, the "World Knowledge" database 604 is accessible over a network such as, but not limited to, a wide area network (WAN), local area network (LAN), the Internet, or a wireless network. In the preferred embodiment of the present invention, the value of N is equal to 7. Whenever a "World Knowledge" entry is identified in the input sentence, the set of word tokens in the input sentence constituting this entry are catenated in one word and regarded as one word token throughout all further processing. The identified "World Knowledge" entry in the input sentence is tagged as "World Knowledge" token and the word token is further assigned one or more theme extracted from the corresponding "World Knowledge" database entry.

TABLE 1

| Theme | No. of Referring Senses |
| --- | --- |
| Agriculture | 2340 |
| Education | 776 |
| Religion | 1605 |
| Transportation | 1425 |
| Medicine | 3962 |
| Economy | 1980 |
| Administration | 805 |
| Information | 1794 |
| Military | 1564 |
| Sports | 1273 |
| Entertainment | 1519 |
| Clerical | 450 |
| Politics | 1696 |
| Geography | 2168 |
| Ceremony | 390 |
| Law | 1580 |
| Arts | 2411 |
| Linguistics | 1197 |
| History | 305 |
| Science | 649 |

At the end of this step, if at least one "World Knowledge" name is identified in the input sentence, the number of word tokens in this sentence is reduced by Y words which is computed as follows:

$$y = \sum_{i=1}^{i=m} (x_i - 1) \quad \text{(Equation 1)}$$

Where m is the number of "World Knowledge" entries identified in the input sentence; $x_i$ is the number of words in the $i^{th}$ "World Knowledge" entry identified in the sentence.

The above process is further clarified through the following example: Assume the simple sentence:

"President Bill Clinton sent a veto to The United Nations."

After consultation of the "World Knowledge" database, two entries are identified: "Bill Clinton" and "The United Nations", the individual tokens of each one of them will be catenated to constitute a single word token tagged with "World Knowledge" tag. A theme with a value="Politics" is assigned to each one of both entries, according to thematic information extracted from the "World Knowledge" database for these specific entries. The new sentence becomes:

"President Bill Clinton sent a veto to The United Nations."

While the original input sentence length was 10 tokens, its length after searching the "World Knowledge" database has become 7 tokens.

Figure 7:
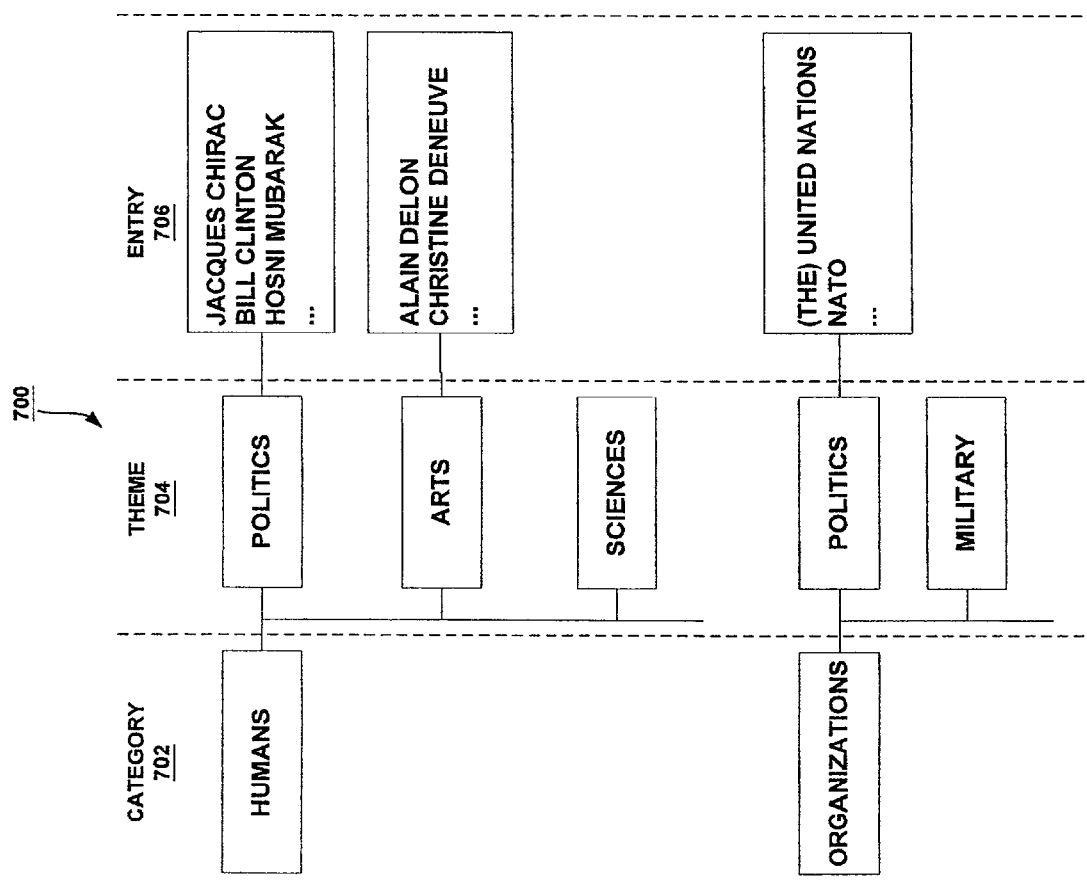
FIG. 7 is a schematic representation of one embodiment of the construction of the World Knowledge database in accordance with the present invention.

FIG. 7 illustrates, in further detail, the "World Knowledge" database 604 (FIG. 6) that consists of a limited predefined set of categories 702, (humans, organizations, locations. . . etc). Each category is further classified into a limited set of themes 704, (politics, sports, military. . . etc). Each category-theme pair contains a limited set of entries 706. This set of entries is always subject to expansion by feeding it continuously with new world knowledge. Each entry is composed of one or more tokens. Each token can be mandatory or optional: e.g. in the entry "The United Nations" the token "the" is optional while "United" and "Nations" are mandatory.

Returning to the method in FIG. 6, the next step (step 606) in the thematic prediction phase involves collecting thematic information (via a thematic tag collector) from the lexicon 608 and identifying thematic words within the input sentence. The input to the thematic tags collector is a sentence consisting of a set of word tokens part-of-speech tagged. Some of these tokens, which have been identified in the "World Knowledge" database, are tagged as "world knowledge" tokens and are also tagged with one or more themes. The thematic tags collector produces as output the same input sentence consisting of word tokens, some of which are "world knowledge" tagged and theme-tagged, and others which are part-of-speech tagged, sense-tagged, and theme-tagged, i.e., the thematic tags collector assigns senses to those non-"world knowledge"-tagged tokens, and for each sense, one or more theme, if available.

Sense and theme tagging is achieved by processing each word token of the sentence from the sentence start to its end. For each part-of speech of each non-"World Knowledge"-tagged word token, the lexicon is accessed and searched to match an identical word/part-of-speech pair. When found, all corresponding senses and themes are collected and assigned to the part-of-speech of the word token subject to processing. At the end of this stage, the input sentence consists of two types of word tokens: words tagged as "World Knowledge" tokens which are sense-unambiguous by definition and which are theme tagged and words that are part-of-speech tagged. Each word/part-of-speech pair is tagged with one or more sense, and each sense is tagged with zero, one or more theme. A word token carrying more than one sense is considered sense ambiguous, and a word token carrying at least one theme tag is considered a "thematic word".

Figure 8:
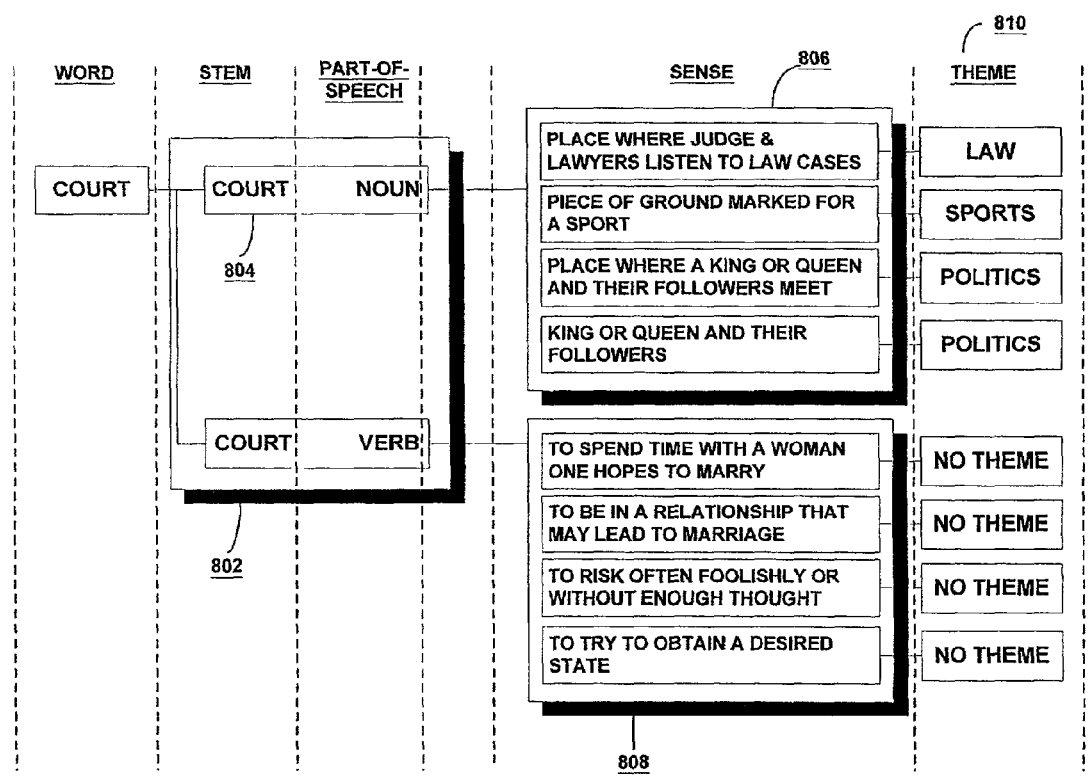
FIG. 8 is a schematic representation of one embodiment of the construction of the theme-annotated lexicon in accordance with the present invention.

FIG. 8 is a schematic representation of one embodiment of the construction of the theme-annotated lexicon in accordance with the present invention. The theme-annotated lexicon contains records 802 for each word. Each word is assigned one or more part-of-speech that may be associated with it. Each word/part-of-speech pair 804, is assigned a set of senses 806, each one of which, consisting of a sense description 808, and a set of lexical and lexico-syntactic features. Each sense may be tagged with one or more theme 810, selected out of a predetermined set of themes such as shown in Table 1.

In the example, the word "court" has been determined to occur as noun (tag "N") and as verb (tag "V"). The word "court" occurs as noun with 4 possible different senses and occurs as verb with 4 other senses. The first sense of the noun part-of-speech for the word "court" has been determined as a thematic sense and has been assigned a theme tag with the value "Law". Similarly senses 2, 3, 4 have been also determined as thematic senses and assigned respectively thematic tags with values: sports, and politics. For the verbal occurrence of the word "court", none of its senses have been determined thematic; hence all of its 4 senses have been left out with no theme values.

Returning to the discussion pertaining to FIG. 6, the last step in the phase of thematic prediction is the identification of the sentence themes 610, which takes as input a sentence consisting of a stream of word tokens, some of which are tagged as "World Knowledge" tokens with theme tags, and the others are tagged with part-of-speech, sense and theme. The sentence themes identifier produces as output a set of one or more theme for the input sentence, by collecting all thematic values assigned to each sense of each part-of-speech for each part-of-speech tagged token, and all thematic values assigned to each "World Knowledge"-tagged token. After collecting all the themes, a union of theme values is generated consisting of a set of unique theme values; each one has associated with it an array of references to the source word tokens which generated it.

Figure 9:
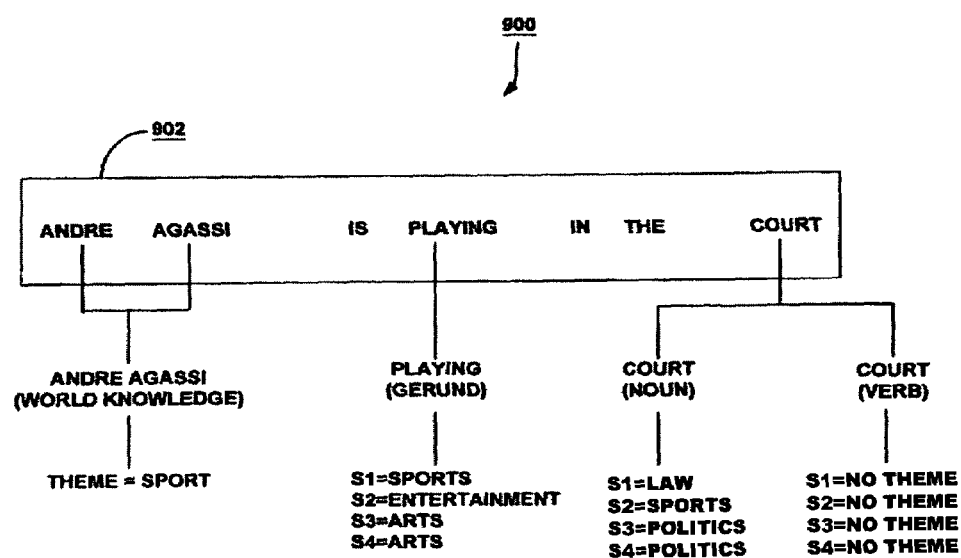
FIG. 9 illustrates an example of sentence processed according to one embodiment of the method of the present invention.
Figure 10:
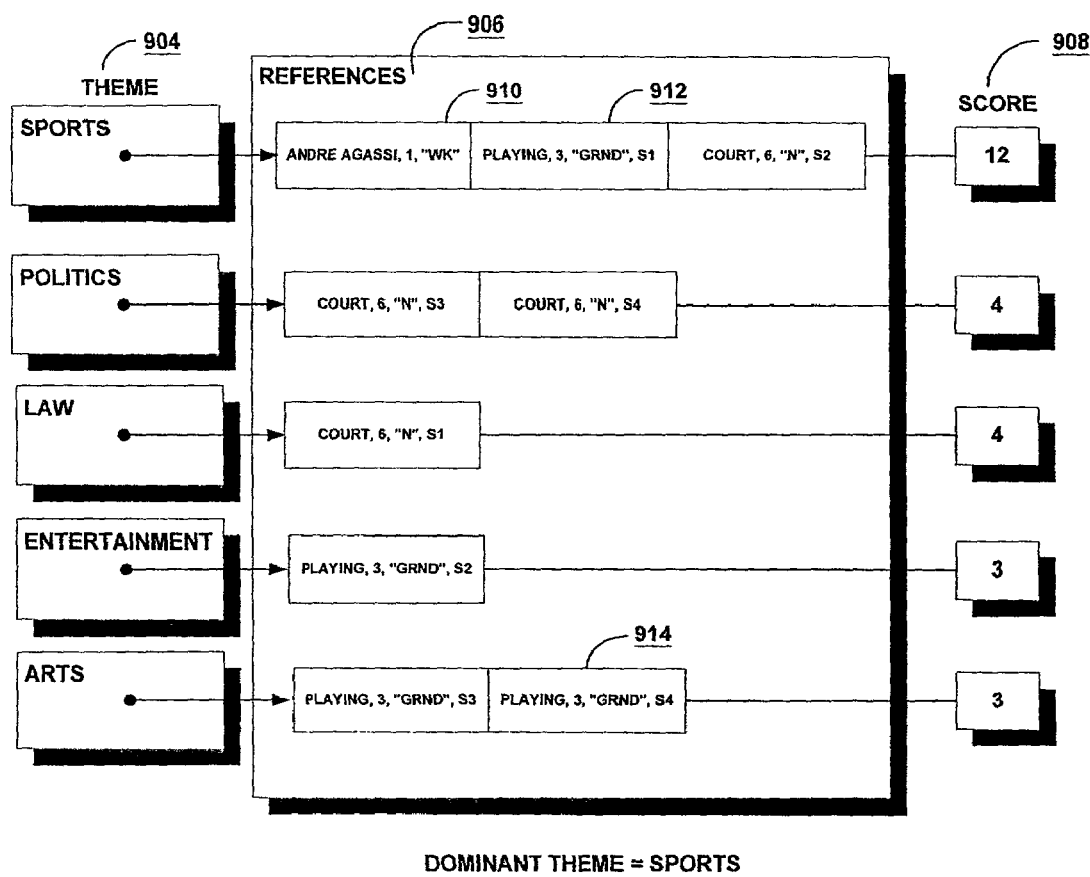
FIG. 10 illustrates an example of a sentence scored according to one embodiment of the present invention.

FIGS. 9 and 10 collectively illustrate an example of a sentence processed by the system of the present invention. In the example shown in FIG. 9, for the input sentence 902, "Andre Agassi is playing in the court", "Andre Agassi" has been detected as a "World Knowledge" token and has been assigned a thematic value="Sports", hence becoming a thematic word token. In the same sentence, two other word tokens have been identified as thematic words, the word playing which occurs with only one part-of-speech tag "GRND" (gerund), and which has been assigned four different senses after consulting the lexicon, each of which was further tagged with thematic values, respectively: sports, entertainment, arts, and arts.

The last thematic word in the input sentence is the word "court" which occurs with two different parts of speech: noun and verb. Each one assigned four different senses. The senses associated with the noun part-of-speech of "court" have been tagged with thematic values, respectively: law, sports, politics and politics, while none of the senses of the verb part-of-speech of "court" was assigned a theme value. As illustrated in FIG. 10, for sentence 902 of the current example, the sentence theme collector generates a set of unique themes 904, namely: sports, politics, law, entertainment, arts. Associated with each one of the unique themes is array 906 of word token references, wherein each token reference 910 contains information about the word which generated the associated theme. Each reference can either be a reference for a "World Knowledge" token 912, by specifying the token string, the token location in the sentence, or a part-of-speech tagged token 912, by specifying the token string, and the token location in the sentence, the part-of-speech which contained the said theme and the sense number which contained the said theme.

Thus, thematic scorer 504 (FIG. 5) takes as input the set of unique themes predicted for the input sentence by thematic predictor 502 (FIG. 5). Each of which has associated with it an array of word token references, as described previously. Thematic scorer 504 (FIG. 5) computes for each of the predicted themes a score, assigns the computed score to the said theme, then ranks predicted unique themes based on the score value associated with each one. The higher the score associated with a specific theme, the higher the probability that the input sentence belongs to this specific theme.

Theme score is calculated according to the following equation:

$$TS_k = \sum_{i=1}^{i=n} c_i \qquad \text{(Equation 2)}$$

Where $TS_k$ is the score value for theme k; n is the number of references for theme k, considering only one reference per word token/part-of-speech pair, and $c_i$ is the coefficient of the $i^{th}$ reference element for theme k. The coefficient for the referencing element i depends on the type (World Knowledge/Non-World Knowledge) and the part-of-speech value, which is one of the four basic parts of speech: noun, verb, adjective, adverb.

Table 2 (given below) shows the different values coefficient $c_i$ can take based on the type/part-of-speech of the associated element i. The reduction of any part-of-speech to its basic part-of-speech is achieved through a predefined part-of-speech mapping table, Table 3 (also given below), consisting of a limited set of records, each one composed of two fields. The first one is the part-of-speech that needs to be mapped and the second one is the basic part-of-speech to which the original one maps.

TABLE 2

| Type/part-of-speech | c (value) |
|---|---|
| World Knowledge | 5 |
| Noun | 4 |
| Verb | 3 |
| Adjective | 2 |
| Adverb | 1 |

TABLE 3

| Original part-of-speech | Basic part-of-speech |
|---|---|
| Past participle | Verb |
| Present 3$^{rd}$ person | Verb |
| Gerund | Verb |
| Comparative adjective | Adj. |
| Superlative adjective | Adj. |
| Plural noun | Noun |
| Proper noun | Noun |
| Mass noun | Noun |

According to the theme scoring process described above, the scores 908 for the predicted themes of the example sentence 902 are ranked resulting in the predominant theme: "Sports". After prediction and scoring of the themes in the input sentence, comes the step 408 (FIG. 4) of reducing word-sense ambiguity on thematic words of the said input sentence.

The input to this phase is the input sentence consisting of word tokens, some of which have been tagged as World Knowledge tokens, and the others are part-of-speech, sense, and theme tagged. The second input to this phase is the scored predicted themes for the said input sentence. The function of this phase is to reduce sense-ambiguity of sense-ambiguous thematic words for the input sentence. This sense ambiguity reduction is achieved by either selecting highly probable senses or eliminating remotely probable senses on sense-ambiguous thematic words.

A sense ambiguous word is one that has at least one part-of-speech having more than one sense. A World Knowledge-tagged word token is always considered sense unambiguous. A thematic word token is one that contains at least one theme on the senses associated with it. Based on the above description, the example sentence shown in FIG. 7, would have 3 thematic word tokens: "Andrea Agassi", "playing" and "court"; and would have 2 sense-ambiguous words which are: "playing" and "court".

Word sense reduction is initiated only if a dominant sentence theme is identified, and the number of thematic words is equal or higher than ¼ of the total number of word tokens in the input sentence, assuming "World Knowledge" tokens as single tokens. The dominant theme is determined as being the theme with the highest score among the predicted themes in case of plurality of predicted themes, and is assumed the predicted theme in case of one predicted theme only. In case there is more than one dominant theme, i.e., there are more than one theme possessing the same highest score, no dominant theme is determined and hence the reduction process is stopped.

Sense ambiguity reduction is achieved as follows: For each part-of-speech of each thematic word token in the input sentence, if the part-of-speech has more than one sense, and at least one of the senses has a thematic value matching the dominant predicted theme, then sense reduction is performed by eliminating all the senses which do not match the predicted dominant theme. By applying the above mentioned method for sense ambiguity reduction, on the example sentence shown in FIGS. 9, the dominant predicted theme is "Sports", the second, third and fourth senses of word "playing" as "gerund", are eliminated, and the first, third and fourth senses of word "court" as "noun" are eliminated. FIG. 10 illustrates scoring the themes associated with the sentence illustrated in FIG. 9.

A system and method has been shown in the above embodiments for the effective implementation of a method and system for theme-based word sense ambiguity reduction. While various preferred embodiments have been shown and described, it will be understood that there is no intent to limit the invention by such disclosure, but rather, it is intended to cover all modifications and alternate constructions falling within the spirit and scope of the invention, as defined in the claims. In particular, the present invention should not be limited by software/program, computing environment or specific computing hardware.

I claim:

1. A method for reducing word sense ambiguities in a sentence, based on thematic prediction, said method comprising the steps of:
   a) receiving an input sentence consisting of a sequence of part-of-speech tagged words;
   b) creating a sequence of sense tagged words from said received sequence of part-of-speech tagged words, each of said sense tagged words having one or more senses, said senses further being theme tagged;
   c) predicting a set of one or more probable themes associated with said created sequence of sense-tagged words;
   d) weighting each of said one or more probable themes from said predicted set; and
   e) reducing sense ambiguities by eliminating remotely probable senses or selecting highly probable senses of said sense tagged words based on said weighted set of one or more probable themes.

2. A method for reducing word sense ambiguities in a sentence, based on thematic prediction, as in claim 1, wherein said set of predicted one or more probable themes for said input sentence belongs to a predefined set of coarse grain themes.

3. A method for reducing word sense ambiguities in a sentence, based on thematic prediction, as in claim 1, wherein said step of predicting a set of one or more probable themes comprises the following steps:
   searching a database and identifying any pre-stored words in said input sentence;
   assigning a theme for each of said identified pre-stored words in said input sentence;
   accessing a lexicon and identifying one or more themes associated with words in said input sentence; and
   outputting all of said assigned themes for each of said identified pre-stored words and said one or more identified themes associated with words in said input sentence.

4. A method for reducing word sense ambiguities in a sentence, based on thematic prediction, as in claim 3, wherein said lexicon comprises a limited set of words for a given language, and each of said words are associated with one or more parts-of-speech, and each of said parts-of-speech is associated with said one or more senses, and each of said one or more senses is assigned one or more themes out of a set of pre-defined themes.

5. A method for reducing word sense ambiguities in a sentence, based on thematic prediction, as in claim 3, wherein said database is accessible over a network.

6. A method for reducing word sense ambiguities in a sentence, based on thematic prediction, as in claim 5, wherein said network is any of the following: wide area network (WAN), local area network (LAN), Internet, or wireless networks.

7. A method for reducing word sense ambiguities in a sentence, based on thematic prediction, as in claim 1, wherein said step of weighting each of said predicted set of one or more probable themes further comprises calculating a theme score, said theme score depending on:
   a coefficient whose value depends on a part-of-speech associated with each of the part-of-speech tagged words in said input sentence, and
   a number of different words with a similar theme in said input sentence.

8. A method for reducing word sense ambiguities in a sentence, based on thematic prediction, as in claim 1, wherein said reduced sense ambiguities are used as inputs to a natural language processing system.

9. A method for reducing word sense ambiguities in a sentence, based on thematic prediction, as in claim 1, prior to said step of predicting a set of one or more probable themes, further comprising the steps of:
   searching a database and identifying any pre-stored words in said input sentence;
   concatenating the identified pre-stored words into one or more word tokens; and
   creating theme tagged word tokens from said one or more concatenated word tokens.

10. A method for reducing word sense ambiguities in a sentence, based on thematic prediction, as in claim 9, further comprising the steps of:
   predicting a set of one or more probable themes associated with said theme tagged word tokens; and
   weighting each of said one or more probable themes from said predicted set of one or more probable themes associated with said theme tagged word tokens using coefficient associated with concatenated word tokens.

11. A system for reducing word sense ambiguities in a sentence, based on thematic prediction, said system comprising:
   a thematic predictor receiving an input sentence comprising a sequence of part-of-speech tagged words and outputting a sequence of sense tagged words and a set of one or more predicted themes associated with said sequence of sense tagged words, each of said sense tagged words having one or more senses;
   a thematic scorer weighting each of said set of one or more predicted themes; and
   a thematic word sense disambiguator reducing sense ambiguities by eliminating remotely probable senses or selecting highly probable senses of said sense tagged words based on said weighted set of one or more probable themes.

12. A system for reducing word sense ambiguities in a sentence, based on thematic prediction, as in claim 11, wherein said thematic predictor further searches a database and identifies any pre-stored words in said input sentence and assigns a theme for each of said identified pre-stored words in said input sentence.

13. A system for reducing word sense ambiguities in a sentence, based on thematic prediction, as in claim 12, wherein said pre-stored words and themes in said database are updated regularly.

14. A system for reducing word sense ambiguities in a sentence, based on thematic prediction, as in claim 12, wherein said database is accessible over a network.

15. A system for reducing word sense ambiguities in a sentence, based on thematic prediction, as in claim 14, wherein said network is any of the following: wide area network (WAN), local area network (LAN), Internet, or wireless networks.

16. A system for reducing word sense ambiguities in a sentence, based on thematic prediction, as in claim 11, wherein said thematic predictor further accesses a lexicon and identifies one or more themes associated with words in said input sentence.

17. A system for reducing word sense ambiguities in a sentence, based on thematic prediction, as in claim 11, wherein said lexicon comprises a limited set of words for a given language, and each of said words are associated with said one or more parts-of-speech, and each of said parts-of-speech is associated with one or more senses, and each of said one or more senses is assigned one or more themes out of a set of pre-defined themes.

18. A system for reducing word sense ambiguities in a sentence, based on thematic prediction, as in claim 11, wherein said system further comprises a morphological analyzer for stemming each word in said input sentence and annotating each of said stemmed words with at least one part of speech tag to form said sequence of part-of-speech tagged words.

19. A system for reducing word sense ambiguities in a sentence, based on thematic prediction, as in claim 11, wherein said system further comprises an interface for displaying said weighted one or more predicted themes and for displaying at least one of said eliminated remotely probable senses and said selected highly probable senses.

20. A system for reducing word sense ambiguities in a sentence, based on thematic prediction, as in claim 11, wherein said thematic scorer further scores each of said predicted set of one or more probable themes by calculating a theme score, said theme score depending on:
   a) a coefficient whose value depends on parts-of-speech associated with each word in said input sentence, and
   b) number of different words with a similar theme in said input sentence.

21. An article of manufacture comprising a computer usable medium having computer readable code embodied therein which reduces word sense ambiguities in a sentence, based on thematic prediction, said medium comprising:
   computer readable program code receiving an input sentence consisting of a sequence of part-of-speech tagged words;
   computer readable program code creating a sequence of sense tagged words from said received sequence of part-of-speech words, each of said sense tagged words having one or more senses, said senses further being theme tagged;
   computer readable program code predicting a set of one or more probable themes associated with said created sequence of sense-tagged words;
   computer readable program code weighting each of said predicted set of one or more probable themes; and
   computer readable program code reducing sense ambiguities by eliminating remotely probable senses or selecting highly probable senses of said sense tagged words based on said weighted set of one or more probable themes.

22. An article of manufacture comprising a computer usable medium having computer readable code embodied therein which reduces word sense ambiguities in a sentence, based on thematic prediction, as in claim 21, wherein computer readable code predicting said set of one or more probable themes further comprises:
   a) computer readable code searching a database and identifying any pre-stored words in said input sentence;
   b) computer readable code assigning a theme for each of said identified pre-stored words in said input sentence;
   c) computer readable code accessing a lexicon and identifying one or more themes associated with words in said input sentence; and
   d) computer readable code outputting all of said assigned and identified themes for said input sentence.

23. An article of manufacture comprising a computer useable medium having computer readable code embodied therein which reduces word sense ambiguities in a sentence, based on thematic prediction, as in claim 21, wherein said computer readable code further provides for an interface for displaying said weighted one or more predicted themes and for displaying at least one of said eliminated remotely probable senses and said selected highly probable senses.

24. A method for processing text of a sentence, based on thematic prediction, said method comprising the steps of:
   a) receiving an input sentence consisting of a sequence of part-of-speech tagged words;
   b) creating a sequence of sense tagged words from said received sequence of part-of-speech tagged words, each of said senses further being theme tagged;
   c) predicting a set of one or more probable themes associated with said created sequence of sense-tagged words;
   d) weighting each of said one or more probable themes from said predicted set; and
   e) refraining from reducing sense ambiguity if more than one of said predicted set of probable themes have the same weighting and if said weighting is the highest one among the set of predicted themes, otherwise reducing sense ambiguities by eliminating remotely probable senses or selecting highly probably senses of said sense tagged words based on said weighted set of one or more probable themes.

25. A method for reducing word sense ambiguities in a sentence, based on thematic prediction, said method comprising the steps of:
   a) receiving an input sentence consisting of a sequence of part-of-speech tagged words;
   b) creating a sequence of sense tagged words from said received sequence of part-of-speech tagged words, each of said senses further being theme tagged;
   c) predicting a set of one or more probable themes associated with said created sequence of sense-tagged words;
   d) weighting each of said one or more probable themes from said predicted set, and
   e) reducing sense ambiguities by eliminating remotely probable senses or selecting highly probably senses from said weighted set of one or more probable themes only if the number of words in said input sentence possessing a dominant theme is equal to or greater than ¼ the total number of words in said input sentence.

26. A method for reducing word sense ambiguities in a sentence, based on thematic prediction, said method comprising the steps of:
   a) receiving an input sentence comprising part-of-speech tagged words;
   b) associating possible senses with at least some of said part-of-speech tagged words, thereby generating sense tagged words, each of said sense tagged words having one or more possible senses;
   c) associating theme tags with at least some of said of said sense tagged words;
   d) scoring possible themes for said sentence based on said theme tags;
   e) selecting a dominant theme for said sentence based upon said scoring; and
   f) reducing sense ambiguities based on the dominant theme, wherein reducing sense ambiguities based on the dominant theme comprises at least one of
      i) eliminating a possible sense of a given sense tagged word as being non-representative of the given sense tagged word based upon the dominant theme, and
      ii) selecting a possible sense of a given sense tagged word as being representative of the given sense tagged word based upon the dominant theme.

* * * * *

UNITED STATES PATENT AND TRADEMARK OFFICE
CERTIFICATE OF CORRECTION

| | |
|---|---|
| PATENT NO. | : 7,184,948 B2 |
| APPLICATION NO. | : 09/882539 |
| DATED | : February 27, 2007 |
| INVENTOR(S) | : Achraf Chalabi |

Page 1 of 1

It is certified that error appears in the above-identified patent and that said Letters Patent is hereby corrected as shown below:

In column 12, line 45, delete "probably" and insert --probable--.

In column 12, line 63, delete "probably" and insert --probable--.

Signed and Sealed this

First Day of May, 2007

JON W. DUDAS
*Director of the United States Patent and Trademark Office*